Jan. 23, 1951 R. V. NEWCOMB ET AL 2,538,879
APPARATUS FOR SPRAYING TREES

Filed Oct. 15, 1945 3 Sheets-Sheet 1

INVENTORS
RALPH V. NEWCOMB
HERBERT F. KEELER
BY
ATTORNEY

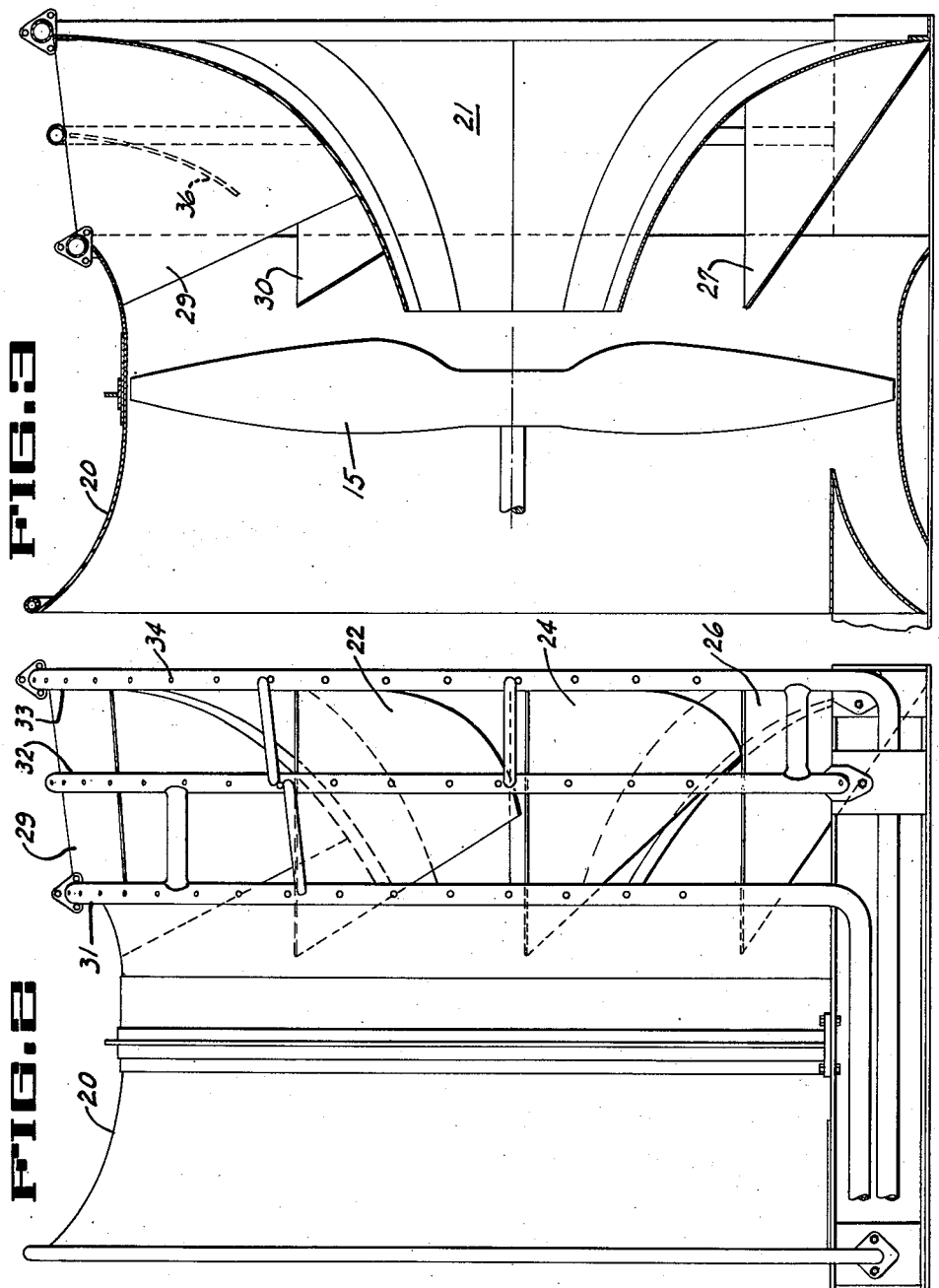

Jan. 23, 1951 R. V. NEWCOMB ET AL 2,538,879
APPARATUS FOR SPRAYING TREES
Filed Oct. 15, 1945 3 Sheets-Sheet 3
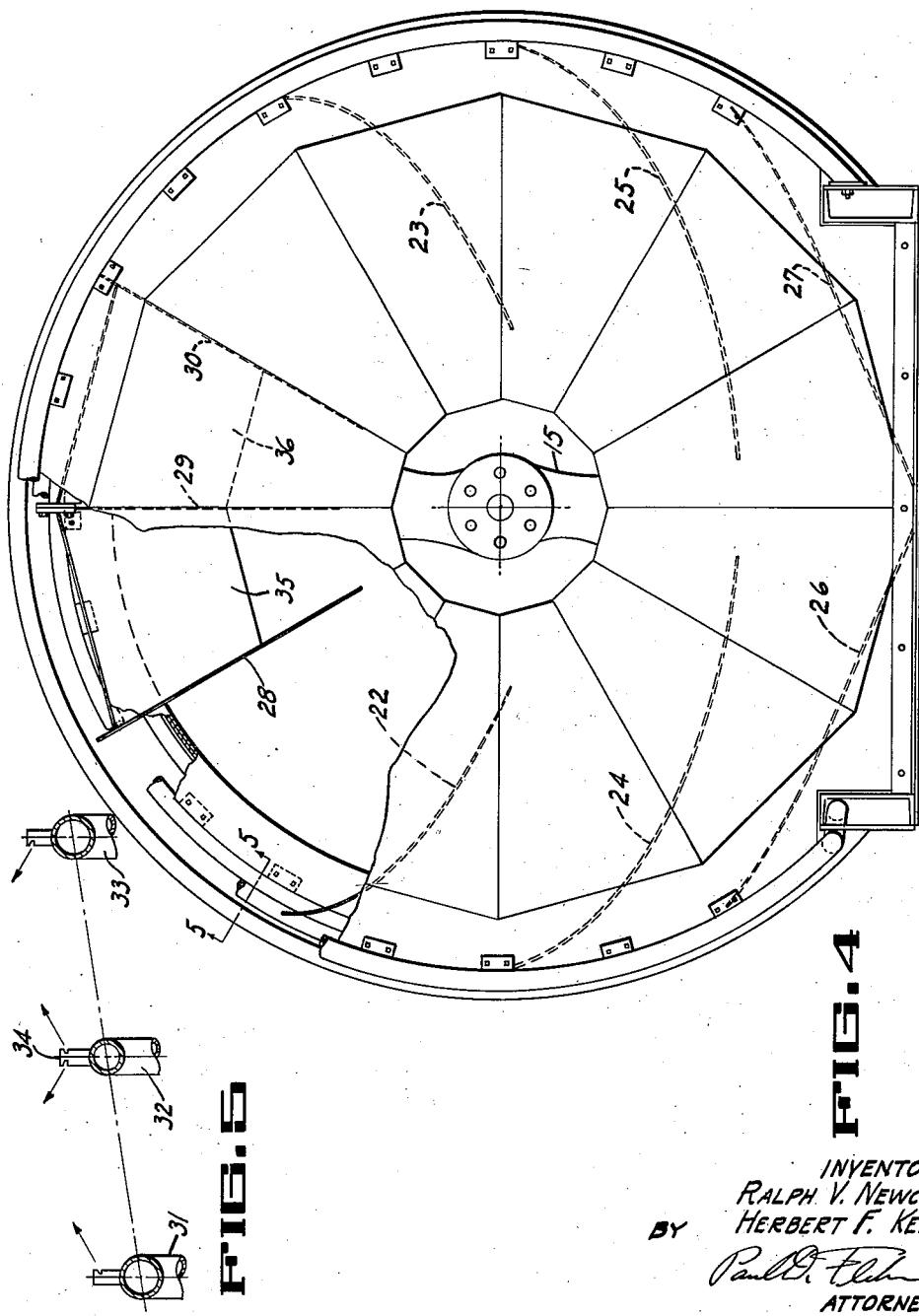
INVENTORS
RALPH V. NEWCOMB
BY HERBERT F. KEELER
ATTORNEY Patented Jan. 23, 1951

2,538,879

UNITED STATES PATENT OFFICE 2,538,879

APPARATUS FOR SPRAYING TREES

Ralph V. Newcomb and Herbert F. Keeler, Marysville, Calif., assignors to Di Giorgio Fruit Corporation, San Francisco, Calif., a corporation of Delaware Application October 15, 1945, Serial No. 622,396

6 Claims. (Cl. 261—30)

This invention relates to spraying machines of the general type adapted to spray liquid material in orchards.

In general it is the object of this invention to contribute to this art certain improvements which have been sought for a period of years. Those familiar with the art will appreciate that spraying machines of this character are not broadly new, and that for many years agriculturalists have sought to obtain complete coverage of large acreage during short periods of time. The art shows various types of mast spray rigs from which spray is blown into the trees of an orchard, numerous fan-like devices which blow quantities of liquid through an orchard, airplane dusting, and various machines for creating an artificial fog of spray material and enveloping the tree to be sprayed. All of these devices have been found to have been subject to certain disadvantages whereby their effectiveness has been decreased.

It is an object of this invention to provide a machine of the character described in which a great volume of air is set in motion carrying droplets, as a rain, of spray material. Experience has shown that the effectiveness of an air stream as a carrier for spray material is in proportion to its ability to displace the entire dead air mass in the trees to be sprayed. Once this dead air mass is set in motion and replaced by the spray laden air, complete coverage of every leaf and twig of the tree by the spray material is a natural result. There appears to be no substitute for a large volume of air in this method of spray application. High velocities apparently cause damage to the tree and seem to force the spray through the tree leaving the sides of the branches not directly exposed to the blast relatively free from spray material. The following motion of the spraying devices of that character appears to disturb the flow of air and materially reduces its driving force. Obstructions such as large limbs, heavy leaf concentrations, etc., show a far greater effect on a small air stream at high velocity than they do on an air stream of large volume with medium velocity. The present invention makes use of a large air mass moving at a speed of approximately 70 miles an hour, measured about one foot from the throat.

It is a further object of this invention to provide a spray device of the character described in which the greater number of parts are eliminated and in which the fewest number of baffles is used.

It is a further object of this invention to provide a spraying device of the character described in which the material sprayed will be directed toward the most essential portion of the tree area.

Further objects and advantages of the present invention will become apparent from the following description and drawing, in which:

Figure 2 is an enlarged side elevational view of the spray head as shown in Figure 1.

Figure 3 is a cross sectional detail of the view shown in Figure 2.

Figure 4 is an end elevation, partly in cross section, of the device incorporating this invention, and Figure 5 is an enlarged cross sectional fragmentary detail of the manifolds and spray nozzles shown in Figure 3.

Figure 1:
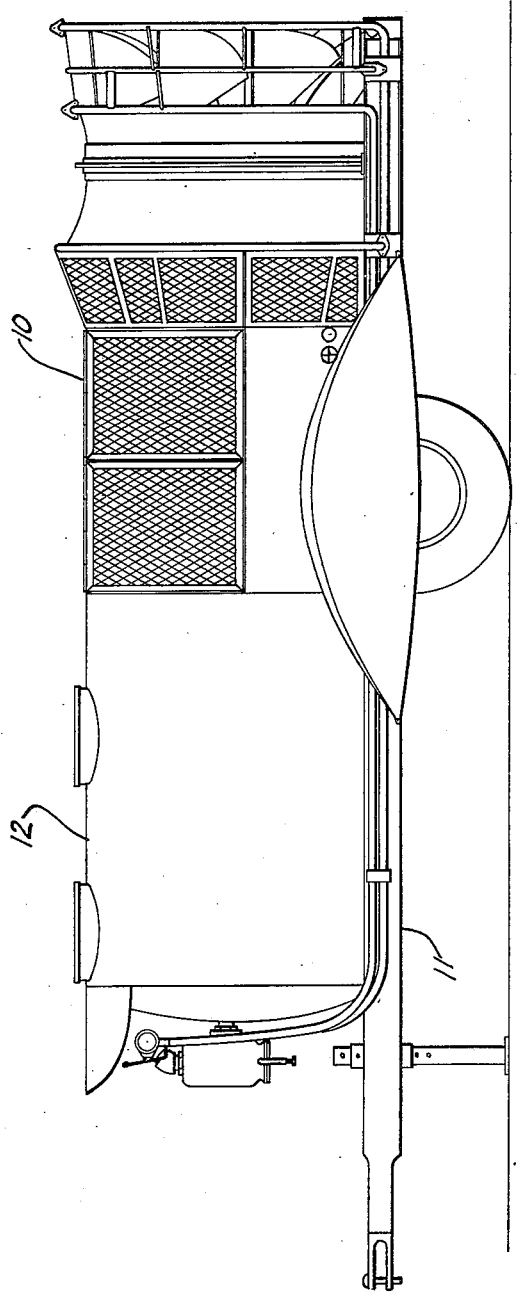
Figure 1 is a side elevational view of a spray device incorporating our invention.

In carrying out this invention, we utilize an air tunnel 10 suitably mounted upon a wheeled frame 11 which may be attached to a tractor or any other suitable vehicle for drawing the same through an orchard to be sprayed. The forward extension of the air tunnel 10 forms various tanks 12 in which may be carried various spraying materials. Rearwardly of the tanks is mounted an internal combustion engine (not shown) which constitutes a source of power for a propeller 15. The propeller is mounted in a housing 20 which consists generally of a short Venturi section, the entrance end of which is as large as practicable and, as shown in Figure 1, preferably of slightly larger diameter than the forward portion of tunnel 10. In the narrowest portion, or throat of housing 20, the propeller 15 is mounted. The exhaust portion of the member 20 is substantially shorter than the entrance portion and is of slightly lesser diameter.

A main baffle 21 is provided which turns the air in a smooth efficient manner at right angles to its original path in a very short distance. It is generally preferably of the hyperbolic parabolic shape shown.

Certain other baffles are provided such as the six curved deflectors 22, 23, 24, 25, 26 and 27 and the three straight radial deflectors 28, 29 and 30.

Spray material is provided to the spraying head by means of three circular tubular manifolds 31, 32 and 33. These manifolds are provided with nozzles 34 through which spray material from tanks 12 is supplied under pressure.

In the preferred commercial embodiment of this invention, propeller 15 is about 48 inches in diameter and, in free air, would deliver approximately 70,000 cubic feet of air per minute at 2400 R. P. M. It is estimated that after the air has been turned as by means of baffles 21, 22, 23, 24, 25, 26, 27, 28, 29 and 30 the device will deliver approximately 45,000 cubic feet per minute. Naturally changes in the diameter of the propeller and the air tunnel and an increase or decrease of the air forced therethrough may be made to suit certain crops and crop conditions; however, the foregoing example has been found satisfactory and effective in the spraying of walnuts and pears.

The main baffle 21 which turns the air in a smooth and efficient manner at right angles to its original path is preferably of the shape shown, as has heretofore been pointed out. A study of the propeller performance shows that an area of approximately fourteen inches in diameter at the center of the propeller constituted dead air except for minor turbulence. Accordingly the main baffle 21 was started at a point six inches from the center line of the propeller location and carried outwardly to a diameter equal to or slightly larger than the exhaust end of the propeller housing 20.

The air driven by propeller 15 tends to assume a rotary motion, generally in the direction in which the propeller turns. Three of the six curved deflectors 22, 23, 24, 25, 26 and 27 are designed to take advantage of that rotary motion. As is noted in the drawings, the rear edges of these secondary baffles are in contact with the primary baffle 21, thereby preventing the flow of air therebetween, and thereby directing the air in a lateral and slightly upwardly direction. By the use of the primary baffle 21 and the secondary baffles 22 to 27, inclusive, that air which would normally be directed downwardly and therefore wasted is directed upwardly and laterally and therefore is of substantial value. It will be noted that the air is turned and directed in a very short area and is turned at right angles to the longitudinal axis of the device and upwardly and laterally simultaneously. In this manner a smooth turn is created and turbulence is reduced to a minimum. Air being ejected from the device through the throat between manifolds 31 and 33 is directed with substantially no turbulence and at substantially right angles to the longitudinal axis of the device and in an arc of substantially 180° extending to both sides and above the apparatus.

The three straight deflectors 28, 29 and 30 are to direct the upward flow of air. As will more fully hereinafter be pointed out their purpose is primarily to save the spray material, although they do aid in the general directing of the air.

A pair of baffles 35 and 36 are provided between radial baffles 28 and 29 and 29 and 30 respectively. They aid generally in the directing of the upward flow of air.

The spray material manifolds 31, 32 and 33 act also as stiffening devices for the apparatus as will more fully hereinafter be disclosed. Manifold 31 is adapted to be secured to the exhaust side of the member 20 and in effect forms one edge of the exhaust throat from which air has been discharged. The manifold 33 is adapted to be peripherally mounted with respect to member 21, likewise acting as a stiffening member, and likewise acting as the other edge of the throat from which air is exhausted. Manifold 32 is mounted equidistant from and parallel with members 31 and 33 and occupies a position substantially in the center of the air stream exhausted from the apparatus. As has been previously pointed out suitable nozzles are provided upon each of the manifolds 31, 32 and 33. Those nozzles on manifold 31 are adapted to direct spray material rearwardly into the air stream (see the arrow). Those nozzles on manifold 33 are likewise adapted to direct spray material forwardly into the air stream (see the arrow), while the nozzles on manifold 32 are adapted to deliver spray material both forwardly and rearwardly into the air stream. It will be obvious that the spray material so delivered from the apparatus constitutes a substantial curtain of liquid spray peripherally of the device and that it is all delivered to the air stream at a point beyond all of the baffles. Various devices of this general character heretofore developed have delivered the material to be sprayed into the device at a point between the propeller and the exhaust throat. This results in having to turn a heavier moisture laden medium by means of the various baffle systems and also results in substantial clogging of the baffles by the deposit of a layer of spray material thereupon. The spray material is exhausted through the various nozzles on manifolds 31, 32 and 33 at a pressure of approximately forty to sixty pounds, which, it will be obvious, is only sufficient to deposit the same in the air stream and is in no manner sufficient to constitute a spraying action of itself. As a matter of fact, when no air is being exhausted through the exhaust throat the spray material will be sprayed only one or two feet beyond the outside diameter thereof.

It will be seen that one set of the baffles 22, 24 or 26 or 23, 25 or 27 will take advantage of the rotary motion of the air stream depending upon the direction of rotation of the propeller. However, it has been found that this rotational delivery of the air has very little effect on our device as we have found that the direction of the air, the quantity thereof and its velocity are substantially the same on both sides of the apparatus. Each row of trees on either side of the device appears to be equally satisfactorily sprayed.

Furthermore the low pressure at which the spray material is discharged from the nozzles on the manifolds 31, 32 and 33 does not break the spray material into a fine mist but rather into numerous droplets whereby a rain of spray material is obtained. No attempt to obtain a fine mist is made inasmuch as observation indicates that heavier droplets will wet the tree more thoroughly than a finely divided mist, thereby resulting in a more substantial coverage of the tree with spray material. The mist appears to be more readily deflected by the heavy currents and turbulence of the pair passing through the tree than do droplets. Mist tends to pass through the tree with the air in which it is entrained whereas the droplets tend to stay on the branches and leaves and not to pass through.

Operation of the device may be more fully described as follows: A suitable quantity of spray material is placed within the tank 12 from which it is delivered to manifolds 31, 32 and 33 and the nozzles 34 thereon at a predetermined pressure by means of a suitably driven pump, not shown. As has previously been pointed out the spray material is delivered to the manifolds at approximately forty to sixty pounds pressure per square inch and is ejected from the nozzles in such a manner that a substantial number of droplets of spray material is provided to form a curtain of droplets substantially concentric with the throat opening between the propeller housing and the peripheral edge of baffle 21.

The propeller 15 is caused to rotate, as by means of a suitable engine, and the air delivered from the propeller is directed by means of baffle 21 and the secondary baffle system radially of the device in an arc of substantially 180° through the throat opening between manifolds 31 and 33 and through the curtain of droplets of spray material, thereby carrying said droplets of spray material to the trees to be sprayed.

As the air leaves the propeller it first engages baffle 21 which tends to direct it radially of the device about an arc of 360°. The secondary baffle system however directs upwardly that portion of the air which would normally be directed downwardly.

The secondary baffle system, particularly the baffle plates 26 and 27, extend substantially one-third of the way around the periphery of the air passageway thus obstructing the lower one-third of the peripheral discharge opening. However, air entering the lower part of the outwardly curved passageway will be deflected upwardly by the said baffles 26 and 27 and upon issuing from the peripheral discharge opening will retain some of its upward component of movement and will continue moving upwardly even after leaving the sprayer. This upward movement of the lower portion of the air will, however, not continue indefinitely but will be obstructed by the remaining air issuing from the peripheral opening and will effectively create a radially extending fan of spray material from the upper 180° of the spray head, as referred to in the second paragraph above. The baffles 26 and 27 perform a further function. Reference has heretofore been made to the fact that the deflecting system changes the direction of the air from an axial flow to a radial flow without any appreciable nozzle effect. The bell-shaped deflector 21 defines, with the outer flared discharge portion of the member 20 an outwardly curved passageway for the air. The sectional area of the entrance to this passageway is somewhat less than the total area of the peripheral discharge opening if the latter is measured throughout 360°. However, the portion of the peripheral opening cut off by the baffles 26 and 27 results in an effective or remaining discharge opening of substantially the same sectional area as the entrance to said passageway referred to above. Thus, it will be seen that the air travelling through said passageway will not be slowed down or speeded up and will move therethrough with substantially uniform velocity thus limiting the turbulence therein with its resultant loss in efficiency to a very minimum.

No nozzle effect is created by this baffle arrangement thereby reducing to a minimum the back pressure to the propeller 15 and increasing the efficiency to the greatest possible extent. The minimum number of baffles is used whereby the deflection of the air is completed in as smooth a manner as possible and with the least possible resistance.

We claim:

1. In a spraying machine, means defining an air passageway having a Venturi portion and a radially outwardly curved discharge end, a rotary air impeller in said passageway rotatable in the plane of its smallest diameter, means serving to change the direction and reduce the turbulence of the stream of air produced when said impeller is rotated, said means comprising an annular member positioned with its smallest diameter adjacent the discharge end of said passageway and having its annular axis aligned therewith, the outer surface of said member having the form of a truncated cone whose sides follow a hyperbolic curve, a plurality of curved baffle plate members attached to the outer surface of said cone and to said discharge end to provide a series of upwardly directed U-shaped deflectors, stationary baffle means in said passageway extending axially and generally radially thereof whereby to resist the whirling component of motion of air moved by said impeller, and a plurality of peripherally arranged nozzles for discharging fluid into the radially outwardly directed air stream.

2. In a spraying machine, means defining an air passageway having a Venturi tunnel portion and a radially outwardly curved portion terminating in a radially outwardly directed peripheral discharge opening, said outwardly curved portion being defined in part by a bell-shaped deflector having a hyperbolically curved surface and arranged adjacent one end of said tunnel portion, means for upwardly directing a stream of air moving along the surface of said deflector including U-shaped members attached thereto, a rotary air impeller in said tunnel portion at its smallest diameter and rotatable in that plane, stationary baffle means in said passageway extending axially and generally radially thereof whereby to resist the whirling component of motion of air moved by said impeller and a plurality of peripherally arranged nozzles for discharging fluid into the radially outwardly directed air stream.

3. In a spraying machine, means defining an air passageway having a Venturi tunnel portion and a radially outwardly curved portion terminating in a radially outwardly directed discharge opening, said outwardly curved portion being defined in part by a hyperbolic bell-shaped deflector arranged adjacent one end of said passageway, a rotary air impeller in said passageway at its smallest diameter and rotatable in a plane coincident thereto, stationary baffle means in said passageway extending axially and generally radially thereof whereby to resist the whirling components of motion of air moved by said impeller, and a plurality of peripherally arranged nozzles for discharging fluid into the radially outwardly directed air stream, and fixed U-shaped deflectors in said passageway and extending between said bell-shaped deflector and outwardly curved portion of the means defining said air passageway and so arranged as to deflect some of the air therein to effect discharge of all of said air from only a portion of said peripheral opening.

4. In a spraying machine, means defining an air passageway having a Venturi portion, an air inlet end and a radially outwardly curved discharge end, a rotary air impeller in said passageway coaxially mounted with respect to said passageway at its smallest diameter, an annular member whose outer surface has the form of a truncated cone with a hyperbolic surface likewise coaxially mounted with respect to said passageway and adjacent said rotary air impeller, a plurality of curved baffle plate members attached to said annular member and said discharge end in a generally upward U-shaped manner, auxiliary baffle means extending generally radially of said outwardly curved discharge end and said annular member to redirect the whirling air moved by said impeller, and a manifold mounted about the periphery of said annular member, said manifold being provided with a plurality of nozzles for discharging fluid into the radially outwardly directed air stream.

5. In a spraying machine, means defining an air passageway having a Venturi portion, an air inlet end and a radially outwardly curved discharge portion, a rotary air impeller in said passageway, an annular member whose outer surface has the form of a truncated cone whose sides are hyperbolically curved and which is coaxially mounted with respect to said passageway and said rotary air impeller, a plurality of U-shaped curved members attached to said discharge portion and to said annular member and having their upper ends adjacent the periphery of said member, auxiliary baffle means extending generally radially of said outwardly curved discharge portion and said annular member to redirect the whirling motion of the air moved by said impeller, and a manifold mounted about the periphery of said primary baffle, said manifold being provided with a plurality of nozzles for discharging fluid into the radially outwardly directed air stream.

6. In a spraying machine of the character described, means defining an air passageway having a Venturi tunnel portion, a rotary air impeller in said passageway and coaxially mounted with respect to said passageway at its smallest diameter, an annular member whose outer surface corresponds in form to a truncated cone having a hyperbolically curved surface likewise coaxially mounted with respect to said passageway, said annular member and the discharge end of said passageway defining an air outlet, a plurality of U-shaped members in the passageway defined by said annular member and the tunnel portion and attached to said annular member and having their upper ends adjacent the periphery of said member, a secondary baffle system cutting off a portion of said air outlet whereby its effective peripheral discharge opening is of substantially the same sectional area as the said tunnel portion, a second baffle means adapted to redirect the whirling body of air moved by said impeller, manifold means mounted adjacent the periphery of said annular member, and a plurality of nozzles on said manifold means for discharging fluid into the air stream discharged through said peripheral discharge opening.

RALPH V. NEWCOMB.
HERBERT F. KEELER.

REFERENCES CITED

The following references are of record in the file of this patent:

UNITED STATES PATENTS

| Number | Name | Date |
|---|---|---|
| 511,781 | Leggett | Jan. 2, 1894 |
| 908,963 | Cramer | Jan. 5, 1909 |
| 1,726,214 | Comins | Aug. 27, 1929 |
| 1,862,396 | Gray et al. | June 7, 1932 |
| 1,864,198 | Johnson | June 21, 1932 |
| 2,150,514 | McInnerney | Mar. 4, 1939 |
| 2,218,198 | Harris | Oct. 15, 1940 |
| 2,331,107 | Daugherty | Oct. 5, 1943 |
| 2,358,318 | Daugherty | Sept. 19, 1944 |

FOREIGN PATENTS

| Number | Country | Date |
|---|---|---|
| 242,533 | Great Britain | Nov. 12, 1925 |
| 320,505 | Great Britain | Oct. 17, 1929 |
| 418,350 | Great Britain | Oct. 23, 1934 |
| 364,138 | Germany | Nov. 17, 1922 |